Figure 5:
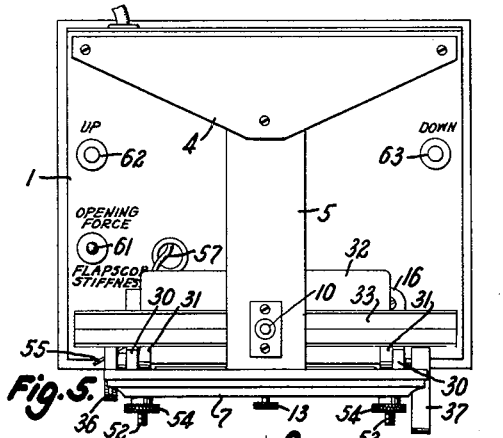

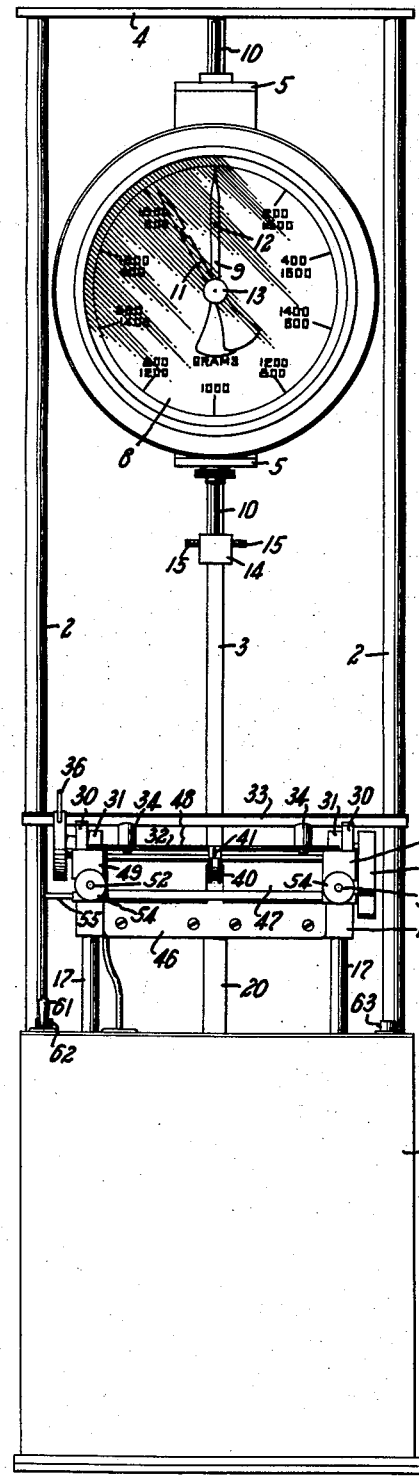

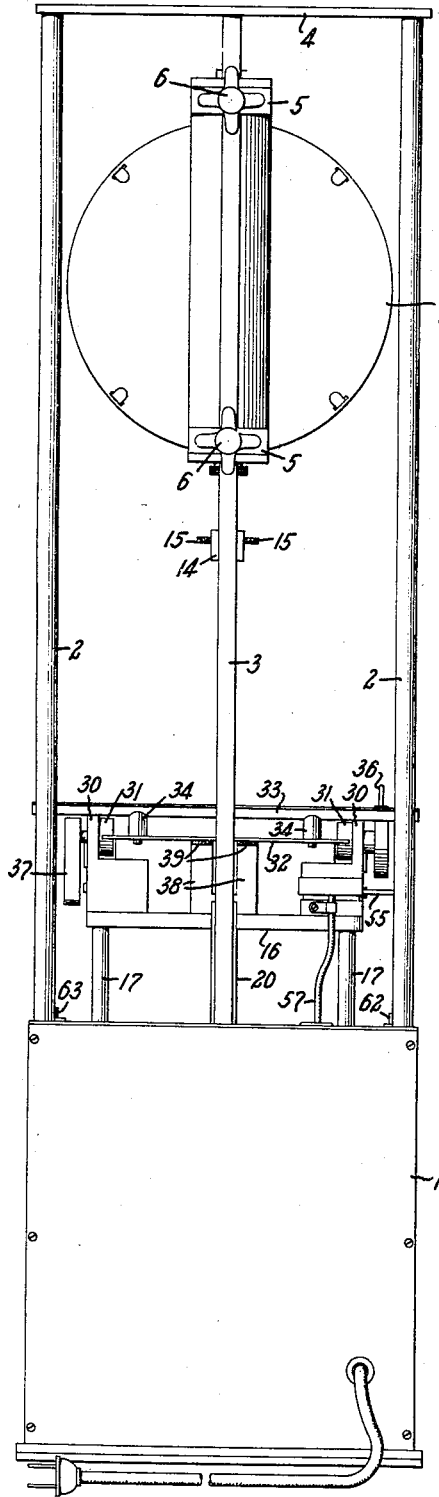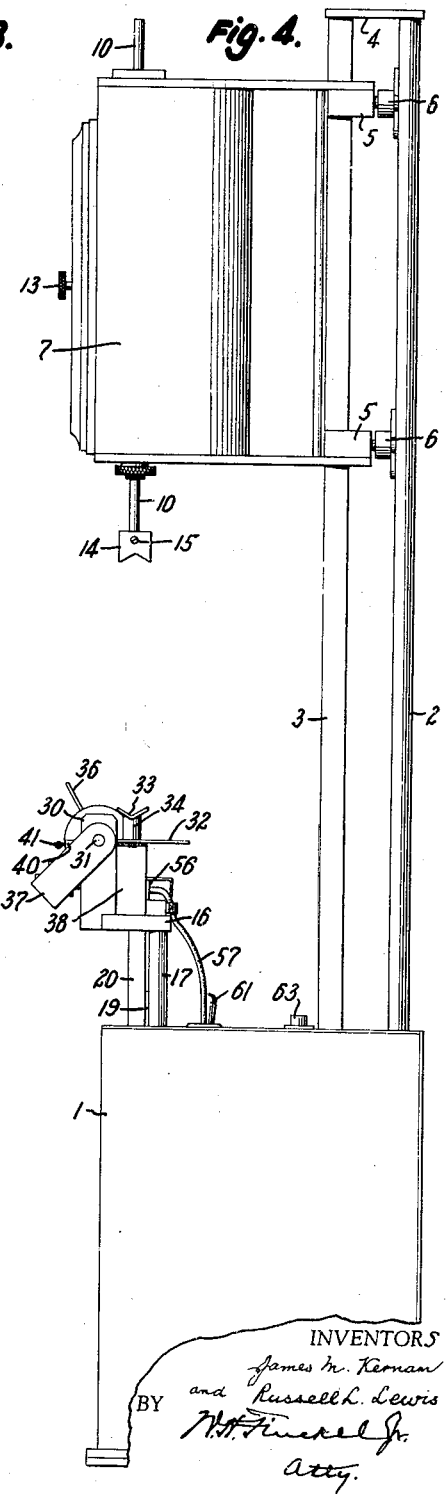

Aug. 23, 1960          J. M. KERNAN ET AL          2,949,770
APPARATUS PRIMARILY FOR TESTING OPENING FORCE AND
FLAP SCORE STIFFNESS CHARACTERISTICS OF CARTONS
Filed Feb. 14, 1958                              5 Sheets-Sheet 3

INVENTORS
James M. Kernan
and Russell L. Lewis
BY
atty.

Aug. 23, 1960   J. M. KERNAN ET AL   2,949,770
APPARATUS PRIMARILY FOR TESTING OPENING FORCE AND
FLAP SCORE STIFFNESS CHARACTERISTICS OF CARTONS
Filed Feb. 14, 1958   5 Sheets-Sheet 4

INVENTORS
James M. Kernan
and Russell L. Lewis
BY
Atty.

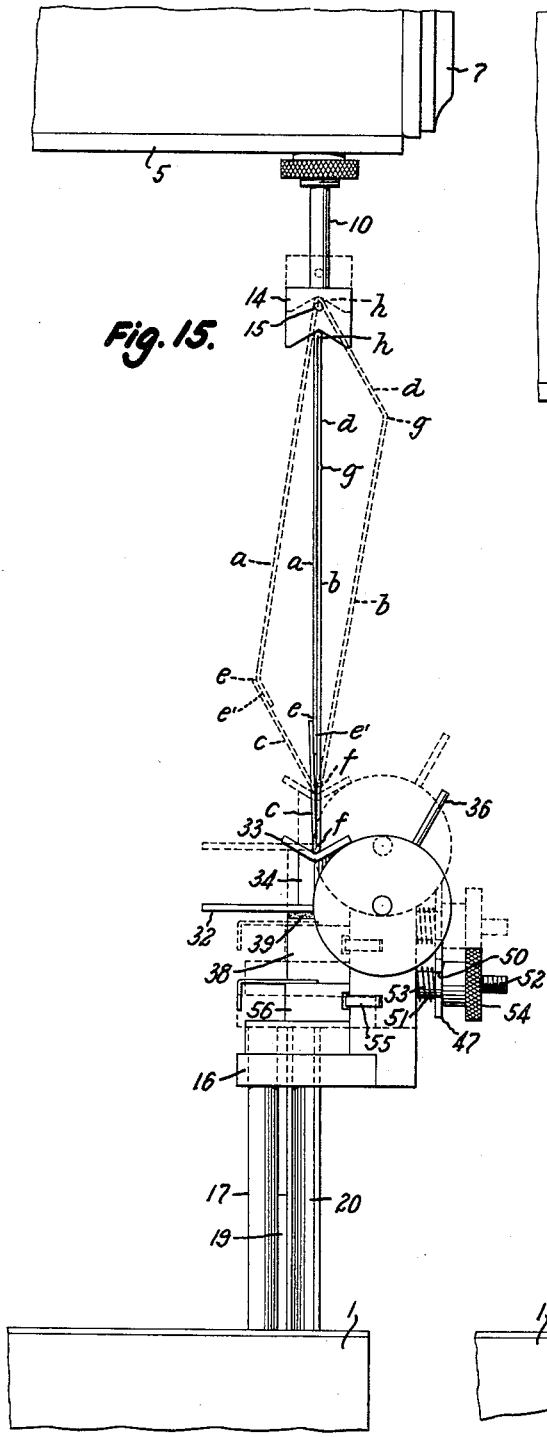
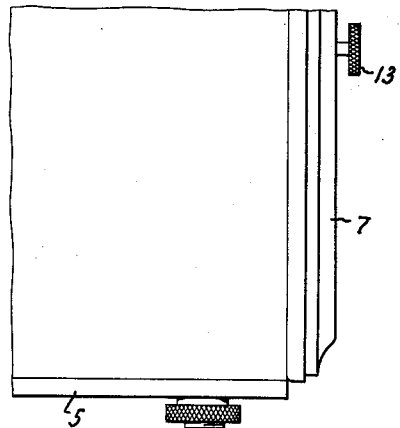
Aug. 23, 1960  J. M. KERNAN ET AL  2,949,770
APPARATUS PRIMARILY FOR TESTING OPENING FORCE AND
FLAP SCORE STIFFNESS CHARACTERISTICS OF CARTONS
Filed Feb. 14, 1958  5 Sheets-Sheet 5
Fig. 15.
Fig. 16.
INVENTORS
James M. Kernan
and Russell L. Lewis
BY
atty.

United States Patent Office 2,949,770
Patented Aug. 23, 1960

2,949,770

APPARATUS PRIMARILY FOR TESTING OPENING FORCE AND FLAP SCORE STIFFNESS CHARACTERISTICS OF CARTONS

James M. Kernan, Akron, and Russell L. Lewis, Rittman, Ohio, assignors to Packaging Corporation of America, a corporation of Delaware Filed Feb. 14, 1958, Ser. No. 715,268

4 Claims. (Cl. 73—93)

This invention relates to apparatus for testing the opening force and folding score characteristics of the finished blanks of paperboard cartons, and embodies structural modifications and refinements of, and additions to, the apparatus covered by the application of the present joint applicant James M. Kernan for patent filed January 17, 1956, Serial No. 559,621, now Patent No. 2,922,302, dated January 26, 1960.

In the use of packaging machines employing paperboard cartons which are fed to the machines in flat-folded condition and must be opened, or squared-up, prior to being filled and closed or sealed, it is important to the proper, continuing, faultless operation of such machines that the cartons supplied to them have substantially uniform characteristics of resistance or submission to breaking pressure applied to them to cause them to open or square-up upon their folding scores. In other words, if a packaging machine is adjusted to apply the opening force required by a given lot of cartons, and other cartons having different opening force requirements or characteristics are inadvertently or accidentally included in the lot, inefficient functioning, or even stoppage, of the machine may result, thus not only causing loss of time and production but probably spoilage of cartons and waste of the material being packaged.

It will be apparent, therefore, that the opening force requirements of all flat-folded cartons in any lot or run be substantially the same and it is envisioned that if such requirements are indicated, say in grams of required pressure, upon the lots of cartons as furnished to the packager, much time and material will be saved and the packaging operation made easier to prepare for and control.

In order to accomplish this desired result it is anticipated that with the requirements of the packager known, particularly the strength of the cartons required for packaging of various commodities, the conditions under which they will be shipped and stored, and the opening force which will eventually be applied to them by any particular packaging machine or machines in order to erect them, or square them up, during the packaging operation, selection of paperboard material of the proper composition and caliper, determination of the proper depth and width of folding scores, and determination of gluing technique, may be made to provide carton blanks which will uniformly meet such requirements.

In other words, with the requirements of the packager known, the customer may be furnished with flat-folded, finished (glued or otherwise secured) carton blanks which will open to tube form under pressure applied by a packaging machine within prescribed limits of minimum and maximum force thus applied.

Thus, after determination of the requirements for a carton, and the production of carton blanks having paperboard characteristics, and provided with folding scores, which are preconceived as proper to embody the desired functional attributes, these blanks will be flat-folded and finished, as by gluing, and can thereafter be subjected, individually, to pressure applied to their opposite folded edges until such pressure is exerted as will cause them to initially open to tube form, that is to say to break upon their folding scores, and observation of the amount of pressure thus necessarily applied will give a reading of the opening force for the particular carton, and this opening force may be recognized as an industry standard for this particular style and functional character of carton.

Obviously, if, upon opening force testing, a carton is found to fall outside of the requirements of a given packaging machine, changes in characteristics of the paperboard used, or in the formation of the folding scores, or in the gluing technique, and particularly in the latter two, will have to be made, and thus the proper combination of characteristics will be arrived at empirically in a manner well known to those skilled in the art of carton fabrication. However, once the proper characteristics have been determined, the opening force test accomplished by application of pressure, as hereinabove described, will serve as a standard for cartons of the type, and having the characteristics, desired.

Thus the opening force test provides a means for measuring the resistance of the carton to opening. It resolves into definite terms the cumulative result of the strength characteristics of the paperboard material, and the effect of the scoring, and the effect of the gluing machine prebreak functions and pressure.

Furthermore, if apparatus is provided for use throughout the carton manufacturing industry whereby certain standards may be set for the opening force required for various accepted types of cartons, say in grams of pressure, a marked advance will be made and now existing difficulties of packagers relieved.

As a further attribute to this adaptability of carton blanks to the proper functioning of packaging machines, it is desirable also that the stiffness, or resistance to closing-folding, of the closure flaps of the cartons of such blanks upon their folding scores be known, and the apparatus of the present invention includes means whereby such characteristics of the flaps may be tested to the end that standardization may be effected.

The primary object of the present invention is, therefore, to provide apparatus for carrying out the desired testing operation, such apparatus being capable of determining with adequate accuracy the force which must be exerted upon a flat-folded and glued carton blank of more or less conventional tube form to cause it to break or open upon its folding scores; in other words to determine or test the so-called "opening force," and which is capable also of testing the stiffness of the closure flaps of the carton of such blank.

Another object of the invention is to provide such an opening force testing apparatus which, although quite accurate in operation, may be manufactured and supplied to members of the industry at a moderate cost as related to the advantages to be realized by both carton manufacturers and their packager-customers through its use.

A further object is to provide a testing apparatus which is simple in construction and operation and may be used repeatedly, as will normally be necessary to answer production requirements of the carton manufacturer, without danger of breakdown or failure to function properly.

Another object is to provide a testing apparatus having such characteristics of semi-automatic operation that its employment by a shop foreman or inspector will not be avoided, thus tending to encourage its use and serving to advance the standardization of the carton characteristics that it is designed to establish.

Concretely considered, the testing apparatus in which the invention is embodied will comprise applied-force responsive scale means, means for supporting and confining a flat-folded carton blank edgewise between such scale means and a force-applying member, and means for applying pressure through such force-applying member to the thus supported and confined carton blank so that such pressure will be reflected upon said scale means to the end that when, as a result of such application of pressure, the carton blank opens or breaks upon its folding scores, the amount of the thus applied pressure will be observable by the operator as registered by the scale means; and the apparatus comprises, further, means whereby its parts may be adjusted for performance of the closure flap stiffness testing, and it includes, moreover, particular elements of construction and arrangements of parts whereby its operation is made more effective, all as will be explained hereinafter more fully and finally claimed.

Figure 6:
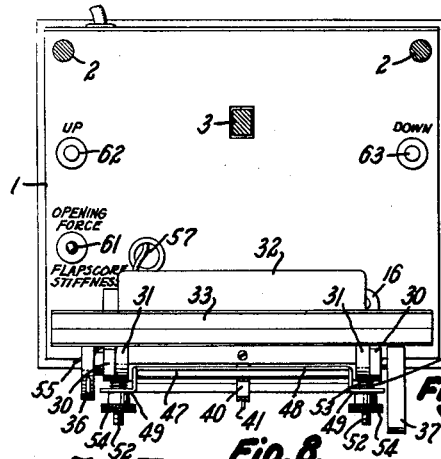
Figure 7:
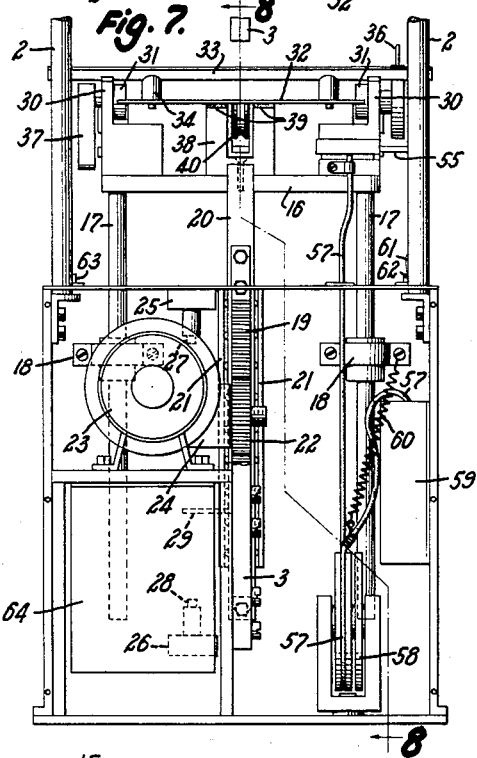
Figure 8:
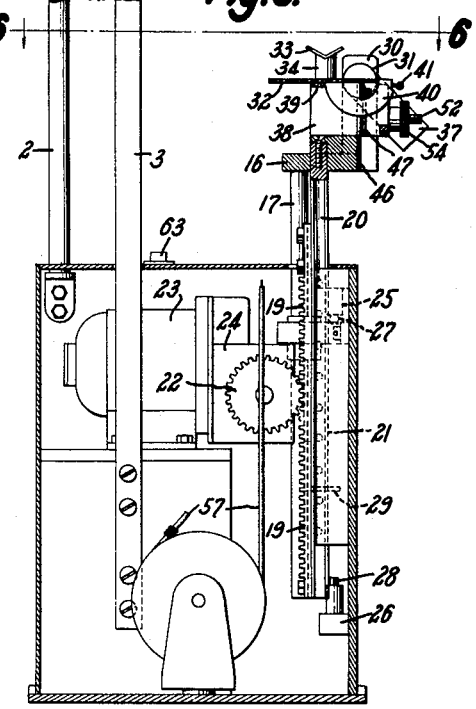
Figures 10, 11, 12:
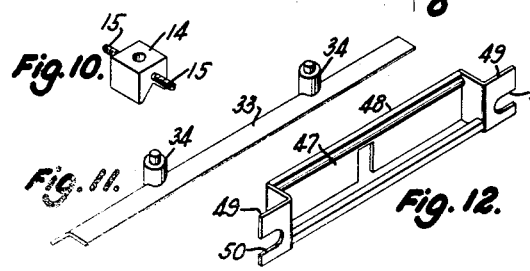
Figure 9:
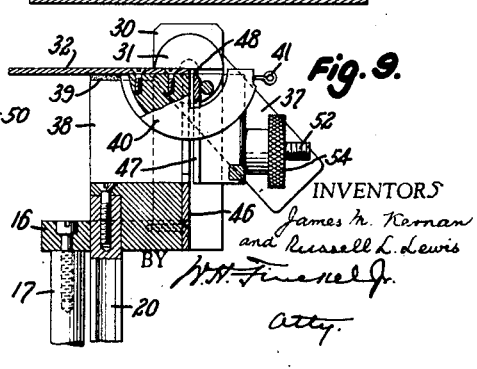
Figure 13:
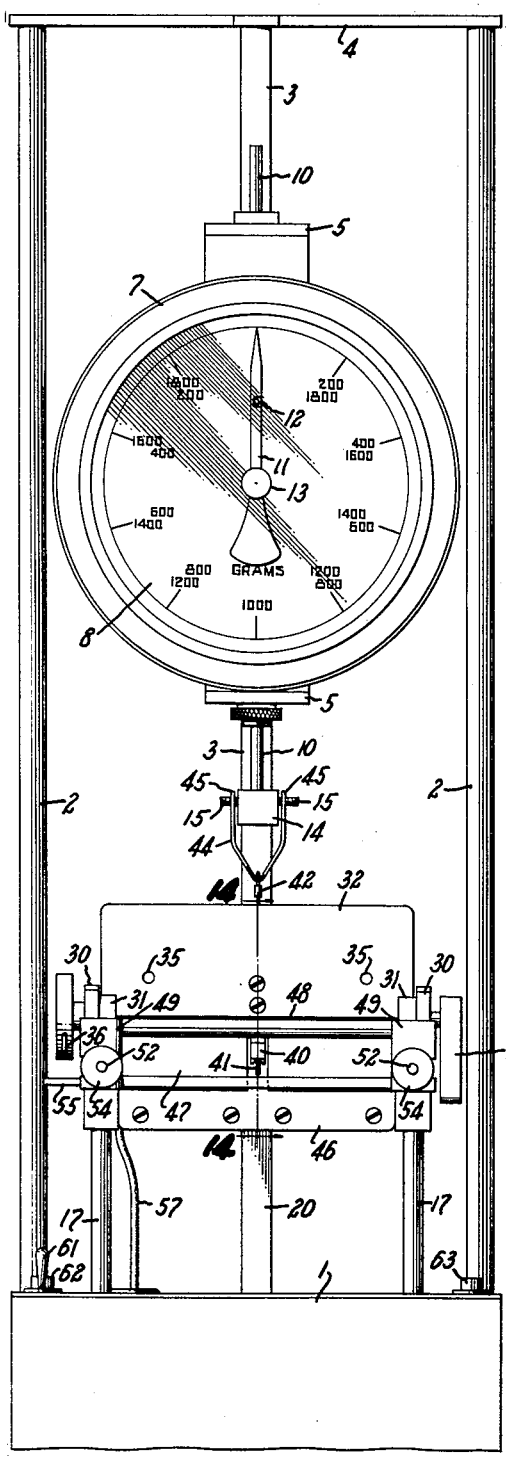
Figure 14:
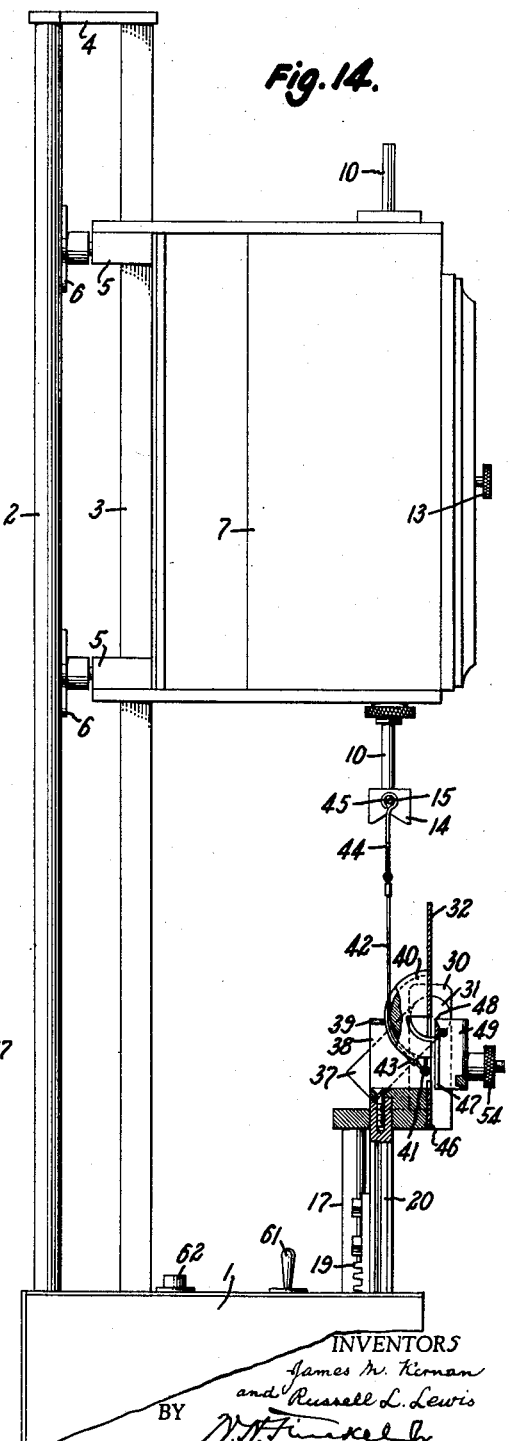

In the accompanying drawings illustrative of the invention, in the several figures of which like parts are similarly designated, Fig. 1 is a front elevation of the testing apparatus of the invention, Fig. 2 is a side elevation of the apparatus viewed from the left of Fig. 1, Fig. 3 is a rear elevation of the apparatus, Fig. 4 is a side elevation of the opposite side of the apparatus from that illustrated in Fig. 2, Fig. 5 is a top plan view of the apparatus, Fig. 6 is a sectional top plan view of the apparatus taken in the plane of line 6—6, Fig. 8, Fig. 7 is a fragmentary rear elevation of the apparatus with the back closure plate of its base removed, Fig. 8 is a sectional elevation taken in the plane of line 8—8, Fig. 7, Fig. 9 is an enlarged fragmentary detail showing in sectional elevation certain elements of the force-applying mechanism of the apparatus, Fig. 10 is a perspective veiw of the carton-blank engaging member, or block, of the scale means, Fig. 11 is a bottom perspective view of the carton-blank supporting member of the force applying means, Fig. 12 is a perspective view showing the inner face of the retainer plate for securing a carton part bearing a closure flap in position for effecting a test of its stiffness, Fig. 13 is a somewhat enlarged front elevation of the apparatus with its parts assembled for the performance of closure flap stiffness testing, Fig. 14 is a sectional side elevation of the apparatus as shown in Fig. 13 and viewed from the left of such figure, with the parts shown in section lying in the plane of line 14—14, Fig. 13, Fig. 15 is a greatly enlarged side elevation of parts of the apparatus illustrating its function in performance of the opening force test, and Fig. 16 is a similarly enlarged sectional side elevation of parts of the apparatus as shown in Fig. 14 and illustrating its function in the performance of the closure flap stiffness test.

Having reference to Fig. 15, for an understanding of the opening force testing technique, it will be seen that the conventional flat-folded carton blank shown comprises the usual broad side walls $a$ and $b$ and narrow side walls $c$ and $d$, which are severally defined from each other by the first folding score $e$ adjacent to the glue lap $e'$, the second folding score $f$, the third folding score $g$ and the fourth folding score $h$, the usual broad and narrow end closure flaps being provided on the end edges of the broad and narrow side walls, respectively, to close and seal the erected and filled carton.

As shown in full lines, Fig. 15, and in accordance with standard practice, the flat-folding is performed upon the second and fourth folding scores $f$ and $h$, respectively, to bring the glue lap $e'$ and the free side edge of the broad side wall $a$ into gluing position, and when the opening force tester of the invention is employed it will give a reading or measurement of the amount of force applied at the edges formed at the second and fourth folding scores $f$ and $h$ necessary to open the folded blank upon these scores and upon the first and third folding scores $e$ and $g$, substantially as shown in broken lines in Fig. 15.

Thus the apparatus of the invention will be employed to measure the amount of prebreak on the glue lap or first score $e$ and third score $g$, and the amount of ironing out on the second and fourth scores $f$ and $h$, respectively, thereby making it possible for the carton customer, or packager, to specify his needs more clearly so that the carton manufacturer may more consistently maintain the opening characteristics of his cartons, especially if there are slight variations in the caliper and other characteristics of, or inherent in, the paperboard from which they are manufactured.

Referring to Fig. 16 for a preliminary consideration of the flap score stiffness testing technique, it is to be understood that a sample comprising a portion of a carton wall or panel $i$ carrying a closure flap $j$ of full normal width with an equally full width folding score $k$ is used for test purposes, and the stiffness characteristics of this sample are subjected to test by bending the flap $j$ upon its folding score $k$ while the panel or wall portion $i$ is held against relative movement, as will be described in more detail hereinafter.

As best shown in Figs. 1 to 6, the apparatus of the invention comprises a base 1 having three upright standards 2, 2 and 3 affixed thereto (Figs. 7 and 8) and rigidly connected at their upper extremities in relatively fixed triangular arrangement by a substantially triangular spacer plate 4 (Fig. 5). Mounted for adjustment vertically of and upon the standard 3 by slides 5 provided with clamping screws 6 (Fig. 3), and held against turning movement upon the standard 3 by virtue of the complemental non-circular, or square, cross sectional shape of the standard (Fig. 6) and the surfaces of the slides 5 cooperating therewith, is a conventional type of dynamometer scale or measuring means 7 having its indicator dial 8 calibrated preferably in grams from 0 to 2000 (Figs. 1 and 13) for reading either counter-clockwise or clockwise in reference to an indicator hand 9 (Fig. 1) mounted upon the hand shaft (not shown) of the scale means 7 for movement therewith in response to upward or downward movement, respectively, of a scale operating shaft 10. If desired, the indicator hand 9 may be supplemented by an indexing hand 11 (Figs. 1 and 13) which is carried along counter-clockwise with the indicator hand 9 when the latter moves in a counter-clockwise direction through the instrumentality of a pin 12 projecting outwardly from the face of the hand 9. A reset button 13 for the indexing hand 11 extends through the dial cover glass of the scale means 7. Conceivably, another, similarly actuated and restored, indexing hand (not shown) may be provided for indexing travel with the indicator hand 9 when the latter is moved in a clockwise direction.

The downwardly extending end of the scale operating shaft 10 carries a V-grooved carton blank engaging member or block 14 separably affixed thereto by diametrically oppositely disposed studs or set screws 15 which are of a length to project outwardly from the side faces of the block 14 (Figs. 1, 3 and 13) for a purpose hereinafter to be explained.

Having reference particularly to Figs. 7 and 8, it will be seen that the force applying means of the apparatus include a horizontal table or platform 16 mounted upon guide rods 17 vertically slidable through the top plate of the base 1 in slide bearings 18 rigidly mounted within the base, and vertical reciprocation, at a slow speed, is imparted to the table 16 by a toothed rack 19 carried by a reciprocable slide bar 20 secured to the table and mounted for vertically guided reciprocation by complemental antifriction bearing means 21 mounted in the base 1, this rack bar 19 meshing with a pinion 22 driven by an electric motor 23 through reduction gearing means 24.

The extent of vertical travel of the table 16 in response to operation of the motor 23 is controlled by limit switches 25 and 26 the depressible switch-actuating elements 27 and 28 of which are in position to be engaged by an operating finger 29 affixed to and travelling with the slide bar 20 of the rack 19.

Mounted for limited oscillating movement in bearing arms 30 upstanding at opposite ends of the table 16 are stub shafts 31 which carry fixed between them, and oscillatable with them, a plate member 32 the upper surface of which lies in a plane coincident with the axis of oscillation of the stub shafts 31, and removably mounted upon this plate member 32 is a trough-like or V-notched carton blank support 33 properly vertically aligned with the block 14 of the scale shaft 10 by shouldered pins 34 which seat in complemental openings 35 (Fig. 13) in the plate member 32. One of the stub shafts 31 carries a rotary member provided with a switch operating pin 36, the purpose of which will be described hereinafter, and the other stub shaft 31 carries a counterweight 37 for the plate member 32.

The plate member 32 with the carton blank support 33 mounted upon it has sufficient weight to overcome the biasing action of the counterweight 37 and hence normally lies in a horizontal position (Figs. 1 to 9 and 15), and is supported in such position by stop means 38 carried by the table 16 and preferably furnished with buffer pads 39.

Having reference particularly to Figs. 9, 12, 13, 14, and 16, it will be seen that to adapt the apparatus for the testing of the flap score stiffness of carton closure flaps, particularly, various adjuncts are provided which will serve to effect a reversal of the functioning of the scale 7 and table 16 during the performance of such testing technique.

To this end, the plate member 32 has affixed to the longitudinal medial portion of its under surface a semicircular cable or cord guide block or fulcrum means 40 having its center on the axis of the stub shafts 31. This guide block 40 is provided with an anchoring eye member 41 to which one end of a light and flexible, but nonextensible, tension member such as a cable or cord 42 may be detachably connected by a snap hook 43 or the like. The cable 42 engages a guide groove in the periphery of the guide block 40 and its opposite end is fastened to the depending loop of a bridle 44 (Figs. 13, 14 and 16) having at its ends eyes 45 which are detachably engageable with the outwardly projecting portions of the set screws or studs 15 to thus provide a flexible, but nonextensible, operating connection between the plate member 32 and the shaft 10 of the scale 7.

Referring particularly to Fig. 16, but with reference also to Figs. 9, 12, 13, 14 and 15, it will be seen that for the purpose of locating and clamping the specimen carton wall or panel part $i$ in position for testing the stiffness of the folding score $k$ of its flap $j$, the table 16 is provided with a vertical guide 46 the front surface of which lies in a plane coincident with the axis of oscillation of the stub shafts 31. Hence, when the plate member 32 is in a vertical position (Figs. 13, 14 and 16) its forward surface will be, in effect, a continuation of the front surface of the guide 46, and therefore the specimen $i$ can be arranged with its own face and the face of its flap $j$ in full surface contact with the coplanar front surfaces of the guide 46 and plate member 32.

For releasably securing the specimen $i$ in this position there is provided a clamping member 47 (see particularly Figs. 6, 9, 12, 13, 14 and 16) having an upper longitudinal relatively blunt knife edge 48 in alignment with which the folding score $k$ of the specimen $i$ is positioned (Fig. 16). This clamping member 47 has offset ends 49 (Figs. 6, 12, 14 and 15) provided with slots 50 for horizontal guiding association with the shanks 51 of screw-threaded studs 52 affixed to the bearing arms 30. The clamping member 47 is normally urged away from the guide 46 by compression springs 53 (Figs. 6 and 15) encircling the shanks 51 of the studs 52 and having their ends bearing against both the bearing arms 30 and the offset ends 49 of the guide member, and proper adjustment of the guide member is accomplished by appropriate manipulation of thumb nuts 54 threaded onto the studs 52.

With reference particularly to Figs. 7, 8, 15 and 16, it will be noted that, in performing the flap score stiffness test, retreat of the platform 16 and associated parts from the scale 7 will, as indicated in broken lines in Fig. 16, cause the plate member 32 to pivot downward by virtue of the connection between the guide block 40 and the scale shaft 10 afforded by the cable or cord 42. Obviously, this rotative movement of the plate member 32 will impart rotation to the stub shafts 31 and cause the switch operating pin 36 to engage and actuate the switch lever 55 (Figs. 1, 2, 3, 5, 6, 7, and 15) of an electric control switch 56 connected through a flexible electric cable 57 on a slack-adjusting drum 58 with a control box 59 (Fig. 7) and therethrough serving to energize and de-energize the motor 23. The slack-adjusting drum 58 is provided with a biasing spring 60 which serves to maintain that portion of the cable 57 between the drum and the switch 56 relatively taut during rise and fall of the table 16.

If desired, and in accordance with usual practice, the flap score stiffness may be subjected to test for both "back bend" and "bend," or reverse bend and closing bend, respectively, by arranging the specimen $i$ first with one of its faces and then the other in contact with the coplanar faces of the guide 46 and plate member 32.

Except for the cable 57, which has connections embodying some mechanical elements, the electric wiring of the apparatus has not been illustrated. However, particularly in Figs. 5 and 6, the manually actuated controls for energizing and de-energizing the motor 23 are illustrated. These controls are shown as including a toggle switch 61, and "Up" and "Down" switch buttons 62 and 63, respectively, for completing circuits through the motor 23, which is of the reversible type, to impart raising or lowering movement to the table 16 through operation of the pinion 22 and rack 19. It will be noted that the toggle switch 61 has adjoining indicia to designate its proper position for "Opening force" testing and "Flap-score stiffness" testing. All of these switches and buttons 56, 61, 62 and 63, and the limit switches 25 and 26 hereinbefore referred to, may be properly wired to relays or other appropriate electrical control means shielded within the control box 59 and within a housing 64 (Fig. 7) and wiring run therefrom to the motor 23.

It is thought that the operation of the device in performing both types of tests for which it is designed will be apparent, in general, from the foregoing description, but for clarity it will be stated that in its use for the testing of the opening force characteristics of carton blanks an operator will select, at appropriate intervals during a run of carton blanks through a folding and gluing machine, individual finished carton blanks to be tested, thus to obtain a comprehensive check upon the opening force characteristics of carton blanks of the entire run.

Referring to Figs. 2, 3 and 15, and particularly to Fig. 15 it will be understood that with the table 16 and scale means 7 so relatively adjusted that their respective V-shaped elements 33 and 14 are in proper proximity to receive between them a flat-folded carton blank of those selected, such blank will be positioned with either of its fold edges $f$ or $h$ resting in the V-notch of the support 33 carried by the table 16 and the motor 23 will be operated to raise the table until the support 33 travels to the position where the opposite fold edge of the carton blank is met by the V-notch of the element 14 carried by the scale shaft 10, as shown in full lines, Fig. 15.

When thus arranged, the pressure-receiving axis between the folds $f$ and $h$, Fig. 15, of the carton blank will extend through the bases of the V-notches of the elements 14 and 33 and the blank will be properly supported and confined for testing.

Thereafter, with his attention centered upon the indicator hand 9 and the scale of the dial 8, the operator will cause the ascent of the table 16 to continue until the carton blank breaks upon its first and third folding scores e and g, as indicated in broken lines, Fig. 15, at which instant he will take a reading, upon the scale of the dial 8, of the applied force or pressure, in grams, at which the break occurred, and will, immediately upon the occurrence of such break, stop the ascent of the table 16. The operator may, of course, rely upon the position finally assumed by the indexing hand 11 under the drive of the indicator hand 9 at the instant of break to give a reading on the scale of the dial 8.

Referring to Figs. 13, 14 and 16, and particularly to Fig. 16, it will be seen that in performing a flap score stiffness test the member 33 is removed from the plate member 32 and then, with the bridle 44 suspended from the screws or studs 15 of the carton engaging block 14 of the scale shaft 10, the cable or cord 42 is attached to the eye member 41 of the guide block 40 of the plate member 32 and to the loop of the bridle, and the table 16 lowered, or the scale 7 raised, until the plate member 32 is in its vertical position but without applying any pull upon the scale shaft 10 which would exert a force sufficient to displace the indicator hand 9 clockwise.

Thereafter, with a specimen i clamped in position against the coplanar surfaces of the guide 46 and plate member 32 by the clamping member 47, and its folding score k horizontally aligned with the knife edge 48 of the guide 46, all as shown in full lines in Fig. 16, the motor 23 is operated to lower the table 16 and such lowering will cause the pull exerted by the cable or cord 42, the upper end of which may be considered as anchored to the scale shaft 10 through the bridle 44, to cause the plate member 32 to pivot upon its bearings 31 and fold the specimen upon its folding score k, the force necessary to do this folding being observed by the operator by attention to the hand 9 as it travels clockwise over the dial 8. By means of the counterweight 37 any imbalance of the plate member 32 will be counteracted and hence the reading on the scale dial 8 will give a reliable showing of the actual force exerted.

The final position which may be assumed by the plate member 32 in the performance of this folding, stiffness testing, operation is indicated in broken lines in Fig. 16, and the limitation of pivotal movement of this plate member 32 to this position is made positive by reason of the fact that the consonant rotation of the switch operating pin 36 has then actuated the switch lever 55 to open the switch 56 and interrupt the circuit through the motor 23.

Having reference to Figs. 5 and 6 it will be understood that the circuits to the motor 23 controlled by the toggle switch 61, the "Up" and "Down" push buttons 62 and 63, respectively, and the switch 56 carried by the table 16, are such that when the toggle switch 61 is set in the "Opening force" position the motor may be directly controlled by the "Up" and "Down" buttons 62 and 63, but when this toggle switch is in the "Flapscore stiffness" position the motor will be controlled by the "Up" and "Down" buttons only through the switch 56 carried by the table 16.

Obviously, a carton manufacturer may establish a pressure chart having opening force and flap score stiffness testing values for all of the appropriate types of cartons in his line, and these values may be made to accord with the requirements of his customers. Also, throughout the carton industry somewhat similar charts could be recognized as proper for setting standards to be complied with in the manufacture of cartons, and especially for cartons to be used with any one of the many packaging machines having recognized operating characteristics or require- ments with which the cartons must be made to conform.

Various changes and modifications are considered to be within the principle of the invention and the scope of the following claims.

What we claim is:

1. Testing apparatus, including a base, a force measuring means, and a test specimen supporting table, said force measuring means and said supporting table being mounted on said base in operatively spaced relation, means for effecting relative movement between said measuring means and table to apply testing force to said test specimen, shaft means connected with said measuring means and serving to actuate the same upon application of said testing force, and means carried by said shaft means and by said table, respectively, for subjecting a test specimen disposed between said shaft means and table to testing force, the means carried by said table including horizontally arranged pivot means, a mounting plate member oscillatively carried by said pivot means, fulcrum means carried by said plate member for translating linear force applied thereto into oscillatory movement of the plate member, means for fixedly positioning a flap score stiffness test specimen in testing position with respect to said plate member, and means providing a connection between said fulcrum means and the shaft carried means of said measuring means for applying such linear force in response to relative movement of said table and measuring means.

2. Testing apparatus as claimed in claim 1, in which said pivot means and said table are provided with complemental switch actuating means, and means including an electric motor are provided for imparting reciprocation to said table with respect to said measuring means, and an electric switch carried by said table and interposed in an electric circuit of said motor, said switch actuating means serving to operate said switch from normally closed position to open position upon oscillation of said plate member to a predetermined position to thereby de-energize said motor and arrest travel of said table.

3. Testing apparatus as claimed in claim 1, in which said plate member has its outer surface in the plane of the axis of said pivot means, and the means for positioning said test specimen include a guide member having a planar guide and clamping face also lying in such plane, and clamping plate means cooperating with said guide member and serving to clamp thereagainst and against the outer surface of said plate member, when the latter is oscillated to vertical position, said test specimen which has a folding score so positioned in substantial alignment with the axis of oscillation of said plate member as to be flexed by appropriate oscillation of said plate member.

4. Testing apparatus as claimed in claim 3, in which said plate member is provided with a counterweight pivoted for oscillatory movement with said plate member and serving to offset imbalance of the plate member during oscillation, and the means serving to connect the shaft means of said measuring means with said fulcrum means include a tension member, whereby upon reciprocative movement of said table away from said measuring means said tension member will cause said plate member to oscillate upon its pivot means and, in the presence of a workpiece held in contact with said plate member, will cause the true force necessarily exerted to effect bending of said workpiece upon its folding score to be registered by said measuring means through the pull of said tension member.

References Cited in the file of this patent

UNITED STATES PATENTS

| | | |
|---|---|---|
| 1,612,415 | Carlson | Dec. 28, 1926 |
| 1,931,925 | Hopkins | Oct. 24, 1933 |
| 2,122,203 | Gogan | June 28, 1938 |
| 2,224,248 | Blum et al. | Dec. 10, 1940 |
| 2,724,264 | Dart et al. | Nov. 22, 1955 |